United States Patent
Etchason

(10) Patent No.: US 7,370,516 B2
(45) Date of Patent: May 13, 2008

(54) METHOD FOR ESTIMATING TRANSMISSION INPUT TORQUE

(75) Inventor: Edmond M. Etchason, New Palestine, IN (US)

(73) Assignee: General Motors Corporation, Detroit, MI (US)

( * ) Notice: Subject to any disclaimer, the term of this patent is extended or adjusted under 35 U.S.C. 154(b) by 226 days.

(21) Appl. No.: 11/285,487

(22) Filed: Nov. 21, 2005

(65) Prior Publication Data

US 2007/0113670 A1    May 24, 2007

(51) Int. Cl.
G01M 15/00 (2006.01)
G01L 5/00 (2006.01)

(52) U.S. Cl. .................. 73/117.2; 73/116; 73/117.3

(58) Field of Classification Search ............ 702/51–66; 73/117.2–117.3
See application file for complete search history.

(56) References Cited

U.S. PATENT DOCUMENTS

| | | | | |
|---|---|---|---|---|
| 4,659,235 A | * | 4/1987 | Gilmore et al. ............. | 374/143 |
| 5,335,568 A | * | 8/1994 | Kammerl et al. ........... | 477/109 |
| 5,400,678 A | * | 3/1995 | Jain et al. .................. | 477/115 |
| 6,530,860 B2 | * | 3/2003 | Ui ............................... | 477/45 |
| 2001/0005705 A1 | * | 6/2001 | Kon et al. .................. | 477/156 |
| 2004/0034460 A1 | * | 2/2004 | Folkerts et al. ............. | 701/54 |
| 2005/0197233 A1 | * | 9/2005 | Hoshiya et al. ............. | 477/39 |
| 2007/0010926 A1 | * | 1/2007 | Dlugoss ...................... | 701/51 |

FOREIGN PATENT DOCUMENTS

| | | | |
|---|---|---|---|
| JP | 2000320655 A | * | 11/2000 |
| JP | 2003307272 A | * | 10/2003 |

* cited by examiner

*Primary Examiner*—Michael Cygan
*Assistant Examiner*—Jonathan Dunlap

(57) ABSTRACT

A method for estimating transmission input torque is provided. The method includes identifying a plurality of measurable characteristics that influence transmission input torque. Thereafter, transmission input torque values are measured on a sample powertrain operating at a plurality of different combinations of the measurable characteristics. A look-up table including the measured input torque values corresponding to each combination of the measurable characteristics is established and saved onto a vehicle memory device. The vehicle is configured to monitor the status of the measurable characteristics during operation. At any given time, the vehicle can retrieve the measured transmission input torque value corresponding to the status of the monitored measurable characteristics wherein the measured transmission input torque value provides an estimate of the transmission input torque of the vehicle.

11 Claims, 2 Drawing Sheets

METHOD FOR ESTIMATING TRANSMISSION INPUT TORQUE

TECHNICAL FIELD

The present invention is drawn to a method for estimating the transmission input torque of a vehicle.

BACKGROUND OF THE INVENTION

It is well known to estimate a vehicle's transmission input torque based on engine throttle position. The estimated transmission input torque values may be implemented, for example, to calculate shift schedules, clutch pressure, clutch apply/release rates, etc. Any imprecision in the estimated transmission input torque value can therefore cause shift aberrations such as improperly timed shifts, short shifts, long shifts, etc.

SUMMARY OF THE INVENTION

The present invention provides a method for precisely estimating the transmission input torque of a vehicle. The method includes identifying a plurality of measurable characteristics that influence transmission input torque. According to a preferred embodiment, the measurable characteristics include torque converter clutch input speed, torque converter clutch slip speed, transmission oil temperature, and torque converter clutch apply pressure. Thereafter, transmission input torque values are measured on a sample powertrain operating at a plurality of different combinations of the measurable characteristics. The torque measurements are preferably obtained in a test lab using a sample powertrain having components substantially similar to those of the particular vehicle to which the method of the present invention is being applied.

A look-up table including the measured input torque values corresponding to each combination of the measurable characteristics is established and saved onto a vehicle memory device. The vehicle is configured to implement a control module and a plurality of sensors adapted to monitor the measurable characteristics as the vehicle is operated. At any given time, the vehicle control module can retrieve from the look-up table the measured transmission input torque value that most closely corresponds to the current status of the monitored measurable characteristics, wherein the measured transmission input torque value provides an estimate of the actual transmission input torque of the vehicle. This retrieved value may then be used for calculating shift schedules, clutch pressure, clutch apply/release rates, etc.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
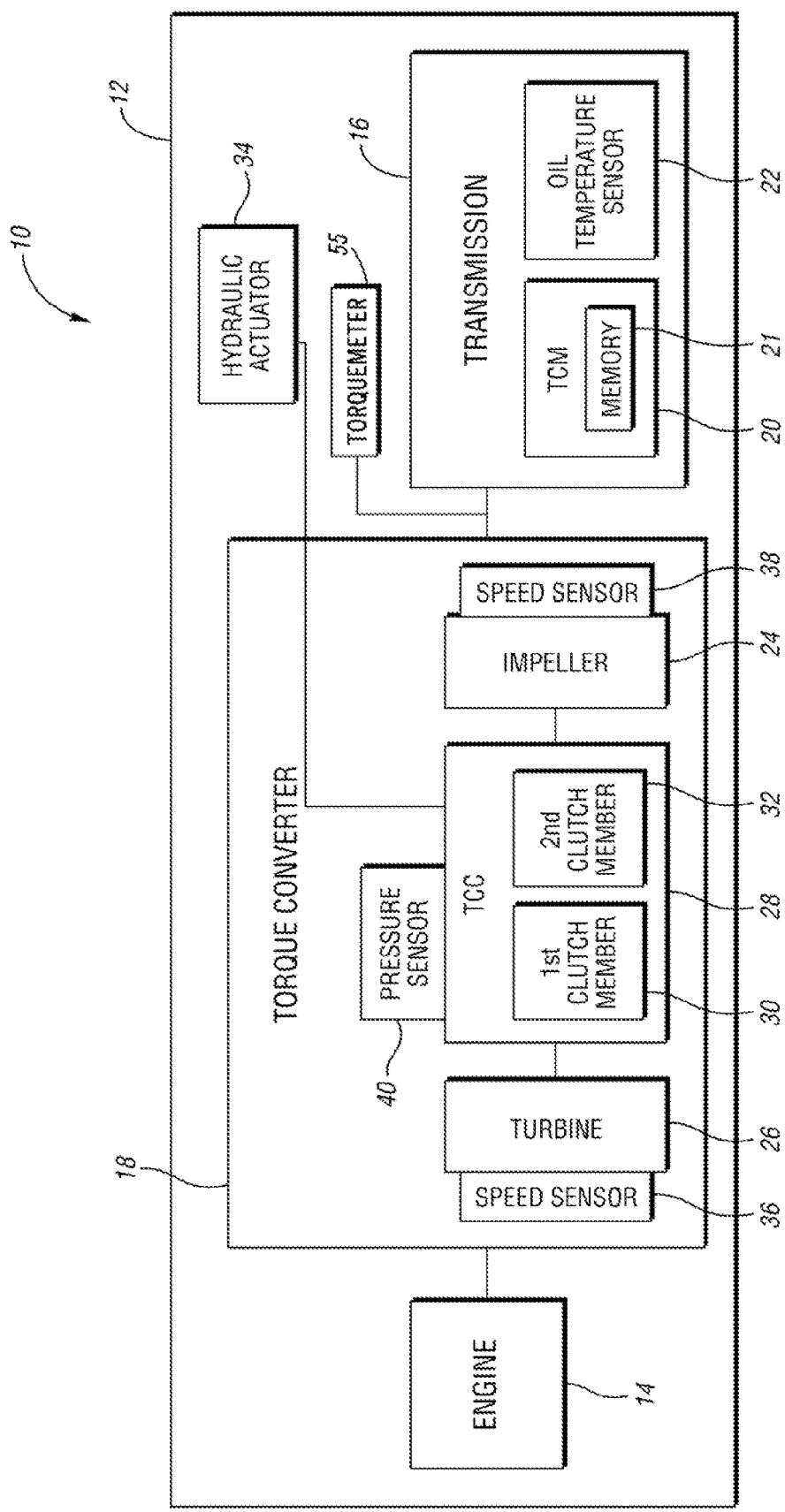
FIG. 1 is a schematic diagram of a vehicle according to the present invention.

Referring to the drawings, wherein like reference numbers refer to like components, FIG. 1 schematically shows a vehicle 10 having a powertrain 12 which includes an engine 14, a transmission 16, and a torque converter 18. The transmission 16 includes a transmission control module 20, or TCM 20, having a memory storage device 21, and a transmission oil temperature sensor 22. It should be appreciated that the vehicle 10 and powertrain 12 are shown for exemplary purposes and that the method of the present invention is also applicable to alternate vehicle/powertrain configurations.

The torque converter 18 includes an impeller 24 (a driving member), a turbine 26 (a driven member), and a torque converter clutch 28, or TCC 28. The TCC 28 is preferably a slipping type torque converter clutch, however, it should be appreciated that the present invention may also be applied to other types of torque converter clutches. The torque converter 18 further includes a housing member (not shown) attached to the impeller 24 such that a chamber full of working fluid (not shown) is formed therebetween.

The impeller 24 is connected to a crankshaft of the engine 14, and engine torque is transmitted from the impeller 24 to the turbine 26 through an operation of the working fluid. The turbine 26 is connected to an input shaft of the transmission 16 to transmit the engine torque to the transmission 16.

The TCC 28 includes a first clutch member 30 attached to the turbine 26, and a second clutch member 32 attached to the impeller 24. The TCC 28 is configured to selectively engage the first and second clutch members 30, 32 to lock the turbine 26 and impeller 24 so that they rotate as a single member. When the TCC 28 is engaged, there is not torque loss through the torque converter 18 such that the efficiency of the powertrain 12 is optimized. The TCC 28 is preferably hydraulically engaged by a conventional hydraulic device such as the hydraulic actuator 34.

A turbine speed sensor 36 is attached to the turbine 26 and is configured to measure the rotational speed of the turbine 26. It should be appreciated that, because the first clutch member 30 is attached to the turbine 26, the rotational speed of the turbine 26 is also the torque converter clutch output speed Vo. An impeller speed sensor 38 is attached to the impeller 24 and is configured to measure the rotational speed of the impeller 24. It should be appreciated that, because the second clutch member 32 is attached to the impeller 24, the rotational speed of the impeller 24 is also the torque converter clutch input speed Vi. Additionally, the torque converter clutch slip speed Vs can be calculated according to the equation Vs=Vi−Vo. A pressure sensor 40 is attached to the TCC 28 and is configured to measure the torque converter clutch apply pressure. The torque converter clutch apply pressure is a measure of the hydraulic pressure transferred to the TCC 28 by the hydraulic actuator 34.

Figure 2:
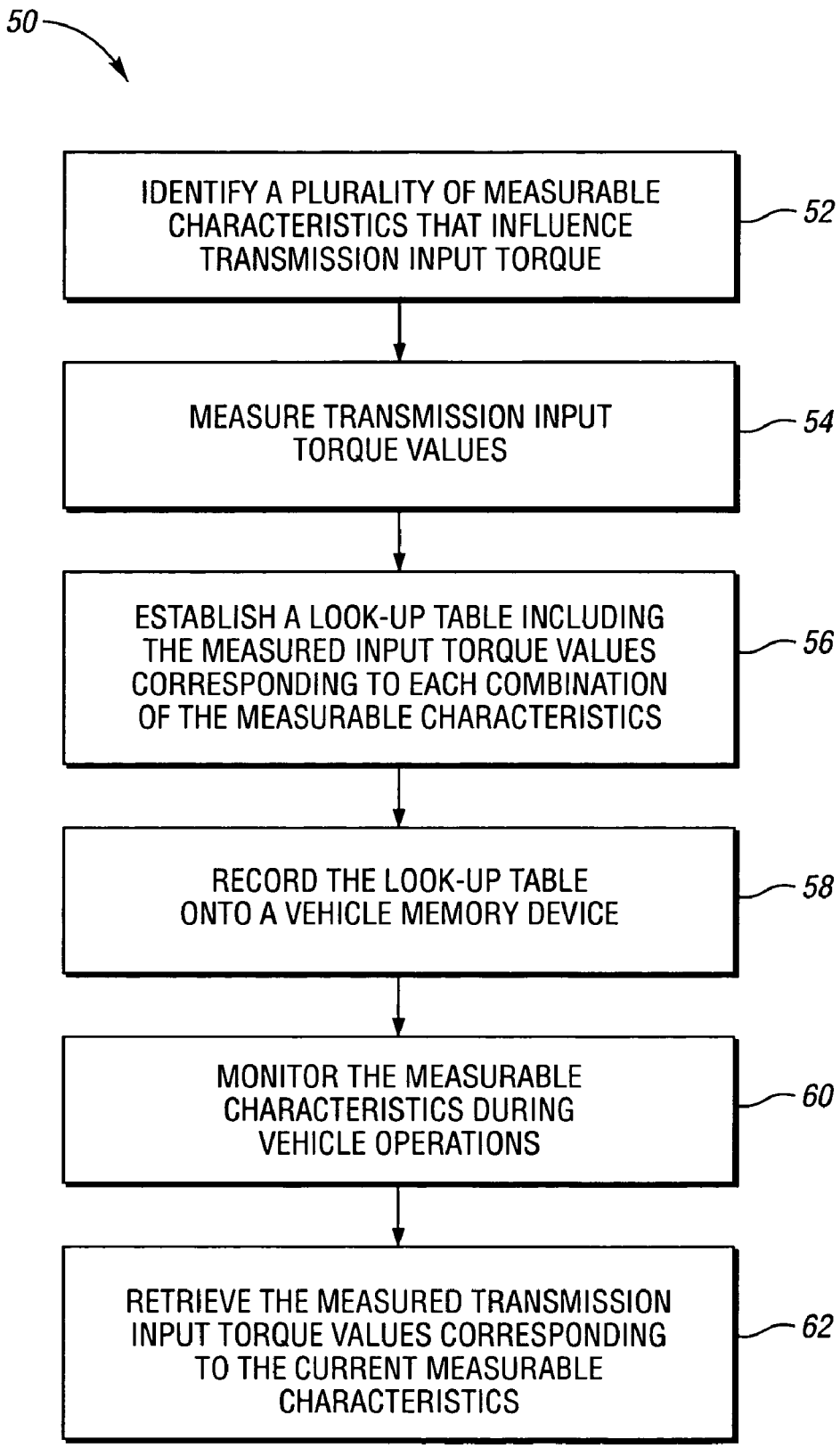
FIG. 2 is flow chart illustrating a method of the present invention.

Referring to FIG. 2, a method 50 for estimating the transmission input torque of the vehicle 10 (shown in FIG. 1) is shown. It should be appreciated that the blocks labeled 52-62 represent steps performed in accordance with the method 50.

At step 52, a plurality of measurable characteristics that influence transmission input torque are identified. According to a preferred embodiment of the present invention, there are four measurable characteristics A, B, C and D, respectively representing torque converter clutch input speed; torque converter clutch slip speed; transmission oil temperature; and torque converter clutch apply pressure.

At step 54, transmission input torque values are measured on a powertrain operating at a plurality of different combinations of the measurable characteristics A-D. The transmission input torque values are preferably measured using a conventional torquemeter 55 (as shown in FIG. 1) attached to the input shaft of a transmission. As conventional torquemeters apply resistance to obtain torque readings, they reduce the efficiency of the system to which they are applied and are therefore not a practical solution for obtaining transmission input torque values of a production vehicle. Accordingly, the torque measurements are preferably obtained in a test lab using a sample powertrain, or multiple powertrains, having components substantially similar to those of the particular vehicle to which the method 50 is being applied. For example, by measuring transmission input torque values on a sample powertrain having components substantially similar to those of the powertrain 12, the measured torque values from the sample powertrain should be similar to the actual torque values of the vehicle 10.

At step 56, a look-up table T is established. The look-up table includes the measured input torque values corresponding to each combination of the measurable characteristics A-D. At step 58, the look-up table T is recorded onto a memory device of the vehicle 10 (shown in FIG. 1). According to a preferred embodiment, the look-up table T is recorded onto the memory storage device 21 of the TCM 20.

At step 60, the measurable characteristics A-D are monitored during vehicle operation. According to a preferred embodiment, the measurable characteristics A-D are monitored by the TCM 20 (shown in FIG. 1) in conjunction with the sensors 22, 36, 38, and 40 (shown in FIG. 1). More precisely, the measurable characteristic A representing torque converter clutch input speed Vi is obtained from the speed sensor 38. The measurable characteristic B representing torque converter clutch slip speed Vs is obtained according to the equation $Vs=Vi-Vo$, where Vi is obtained from sensor 38 and Vo is obtained from sensor 36. The measurable characteristic C representing the transmission oil temperature is obtained from sensor 22. The measurable characteristic D representing the torque converter clutch apply pressure is obtained from sensor 40. The data recorded by the sensors 22, 36, 38, and 40 is transferred to the TCM 20 so that at any given time, the current status of the measurable characteristics A-D may be obtained.

At step 62, the measured transmission input torque value that most closely corresponds to the current values of the measurable characteristics A-D is retrieved from the look-up table T. According to a preferred embodiment, the TCM 20 (shown in FIG. 1) retrieves the measured transmission input torque value from the memory 21 (shown in FIG. 1). The measured transmission input torque value retrieved from the look-up table T represents an estimate of the actual transmission input torque of the vehicle 10 (shown in FIG. 1) which may be used for calculating shift schedules, clutch pressure, clutch apply/release rates, etc.

While the best modes for carrying out the invention have been described in detail, those familiar with the art to which this invention relates will recognize various alternative designs and embodiments for practicing the invention within the scope of the appended claims.

The invention claimed is:

1. A method for estimating transmission input torque of a vehicle, said method comprising:

measuring transmission input torque values of a powertrain operating at a plurality of predefined combinations of a torque converter clutch input speed, a torque converter clutch output speed, a torque converter clutch apply pressure, and a transmission oil temperature;

establishing a look-up table including the measured transmission input torque values and the predefined combinations corresponding to each measured transmission input torque value;

monitoring the torque converter clutch input speed, the torque converter clutch output speed, the torque converter clutch apply pressure, and the transmission oil temperature in a vehicle; and retrieving from the look-up table the measured transmission input torque value that most closely corresponds to the current status of the monitored torque converter clutch input speed, torque converter clutch output speed, torque converter clutch apply pressure, and transmission oil temperature, wherein the measured transmission input torque value provides an estimate of the actual transmission input torque of the vehicle.

2. The method of claim 1, further comprising-calculating a torque converter clutch slip speed using the torque converter clutch input speed and the torque converter clutch output.

3. The method of claim 1, wherein said measuring transmission input torque values includes measuring transmission input torque values of a sample powertrain having components substantially similar to the powertrain components of the vehicle.

4. The method of claim 1, wherein said measuring transmission input torque values includes implementing a torquemeter to measure the transmission input torque values.

5. The method of claim 1, further comprising saving the established look-up table to a memory device of the vehicle.

6. The method of claim 5, wherein said monitoring the measurable characteristics includes implementing a transmission control module and a plurality of sensors to monitor the measurable characteristics.

7. The method of claim 6, wherein said retrieving from the look-up table the measured transmission input torque value includes retrieving the measured transmission input torque value from the vehicle memory device.

8. A method for estimating transmission input torque of a vehicle, said method comprising:

providing a look-up table including a plurality of measured transmission input torque values and a combination of a torque converter clutch input speed, a torque converter clutch output speed, a torque converter clutch apply pressure, and a transmission oil temperature corresponding to each measured transmission input torque value;

monitoring the torque converter clutch input speed, the torque converter clutch output speed, the torque converter clutch apply pressure, and the transmission oil temperature in the vehicle; and retrieving from the look-up table the measured transmission input torque value that most closely corresponds to the current status of the monitored torque converter clutch input speed, the torque converter clutch output speed, the torque converter clutch apply pressure, and the transmission oil temperature wherein the measured transmission input torque value provides an estimate of the actual transmission input torque of the vehicle.

9. The method of claim 8, further comprising saving the look-up table to a memory device of the vehicle.

10. The method of claim 9, wherein said monitoring the measurable characteristics includes implementing a transmission control module and a plurality of sensors to monitor the measurable characteristics.

11. The method of claim 8, further comprises calculating a torque converter clutch slip speed using the torque converter clutch input speed and the torque converter clutch output speed.

* * * * *